US006618404B2

(12) United States Patent
Mattox

(10) Patent No.: US 6,618,404 B2
(45) Date of Patent: Sep. 9, 2003

(54) METHOD FOR PRODUCING HIGHLY ACCURATE FREQUENCY AND FM OF A LASER

(75) Inventor: Barry G. Mattox, Orlando, FL (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 09/883,246

(22) Filed: Jun. 19, 2001

(65) Prior Publication Data

US 2003/0021309 A1 Jan. 30, 2003

(51) Int. Cl.[7] .............................. H01S 3/117; H01S 3/10; H01S 3/13
(52) U.S. Cl. ............................ 372/32; 372/13; 372/23; 372/29.023; 372/22; 372/26
(58) Field of Search ............................. 372/32, 13, 23, 372/29.023, 22, 26

(56) References Cited

U.S. PATENT DOCUMENTS

| | | | |
|---|---|---|---|
| 5,073,331 A | 12/1991 | Shirasaki | |
| 5,432,629 A | 7/1995 | Shikada et al. | |
| 5,479,423 A | 12/1995 | Tanikawa | |
| 5,706,084 A | 1/1998 | Gutierrez | |
| 5,850,305 A | * 12/1998 | Pidgeon | 359/187 |
| 6,240,109 B1 | * 5/2001 | Shieh | 372/18 |
| 6,370,169 B1 | * 4/2002 | Imajuku et al. | 372/32 |

* cited by examiner

Primary Examiner—Sheila V. Clark
Assistant Examiner—Joseph Nguyen
(74) Attorney, Agent, or Firm—Burns, Doane, Swecker & Mathis, LLP

(57) ABSTRACT

A method and apparatus for accurately and precisely controlling the frequency (wavelength) and periodic frequency modulation of a laser are provided. An ADC (Analog to Digital Converter) is used to sample the output of a modified interferometer used as a delay line discriminator, and quadrature components of the sampled output are generated. An arctangent function (e.g., atan2) is applied to convert the quadrature components to a phase measure that is proportional to the laser frequency. Correlator circuits (e.g., cost-efficient correlator circuits) are provided to extract average frequency, modulation peak deviation, and modulation phase error signals. Control-loop feedback using the extracted signals is used to adjust the average frequency, modulation deviation, and modulation phase to respective set points.

5 Claims, 9 Drawing Sheets

*Instantaneous Frequency Measure from Experimental Interferometer*

*Corrected Instantaneous Frequency Measure from Interferometer Experiment*

*Interferometer Frequency Measurement Error versus Integration Time*

*Phase Consistency as a Function of Integration Time*

*Frequency Measurement Error versus Arctangent ROM Size*

METHOD FOR PRODUCING HIGHLY ACCURATE FREQUENCY AND FM OF A LASER

BACKGROUND OF THE INVENTION

1. Field of the Invention

The invention relates generally to the field of modulating a frequency or wavelength of electromagnetic waves, for example modulating laser frequencies when range-finding.

2. Background Information

When a laser is used to determine range or distance to an object, accuracy of the determined range depends on how accurately or precisely the light frequency or wavelength of the laser can be modulated. Accordingly, accurate and inexpensive methods for modulating laser frequencies are desirable.

SUMMARY OF THE INVENTION

In accordance with exemplary embodiments of the invention, a method and apparatus are provided for accurately and precisely modulating the wavelength and phase of a laser. An ADC (Analog to Digital Converter) is used to sample the output of a delay line discriminator (e.g., an inteferometer) translated to an intermediate frequency (IF) carrier. Quadrature components of the sampled output are generated and an arctangent function (e.g., atan2) is applied to convert the quadrature components to a phase measure that is proportional to the laser frequency. Correlator circuits are provided to extract average frequency, modulation peak deviation, and modulation phase error signals. Control-loop feedback using the extracted signals is used to adjust the average frequency, modulation deviation, and modulation phase to respective set points.

BRIEF DESCRIPTION OF THE DRAWINGS

Other objects and advantages of the present invention will become apparent to those skilled in the art from the following detailed description of preferred embodiments, when read in conjunction with the accompanying drawings wherein like elements have been designated with like reference numerals and wherein.

DETAILED DESCRIPTION OF THE PREFERRED EMBODIMENTS

In accordance with the invention, a method is provided for generating highly stable and accurate sinusoidal frequency modulation (FM) of a continuous wave (CW) laser. High accuracy is needed, for instance, when employing an FM-CW laser to determine range to a target.

In accordance with an exemplary embodiment of the present invention, it has been found that it is not difficult to obtain highly linear modulation characteristics, wherein the actual frequency modulation produced is sinusoidal with very little distortion, when the applied modulation control signal (e.g., a voltage signal) is sinusoidal. Because of this, use of a sinusoidal modulation waveform allows one to produce highly accurate frequency modulation by adjusting only two parameters: 1) modulation depth (FM deviation, e.g. peak deviation from the center frequency), and 2) modulation phase (e.g., a phase difference between the modulation control signal and the signal being modulated). For some laser rangefinders, measurement accuracy of these two parameters should be better than 0.1% for measured peak-to-peak FM deviation, and 0.1 degrees for measured absolute modulation phase.

In accordance with an exemplary embodiment of the invention, a control device for accurately modulating the frequency of a CW laser includes a delay-line interferometer for sampling the CW laser. The delay-line interferometer includes a frequency-offset in one or both legs of the optical path of the interferometer. The frequency offset can, for example, be generated using one or more acousto-optical modulators (AOMs). The control device also includes an intermediate frequency processor (e.g., an amplifier and a bandpass filter) along with an Analog-to-Digital Converter (ADC), for filtering and then converting the output of the interferometer. The control device includes a digital quadrature module that receives the output of the ADC and generates or extracts quadrature components having highly accurate amplitude and phase balance. The control device further includes an arctangent function module (e.g., a lookup table in ROM or RAM), that converts the quadrature components from the digital quadrature module to a phase measure that is proportional to the laser frequency. Correlator circuits are also included in the control device. The correlator circuits extract information from the phase measure such as modulation peak deviation, average frequency of the laser, and modulation phase error. The information extracted by the correlator circuits is used to control the modulation of the laser so that the amplitude and phase of the modulation are correct.

Figure 1:
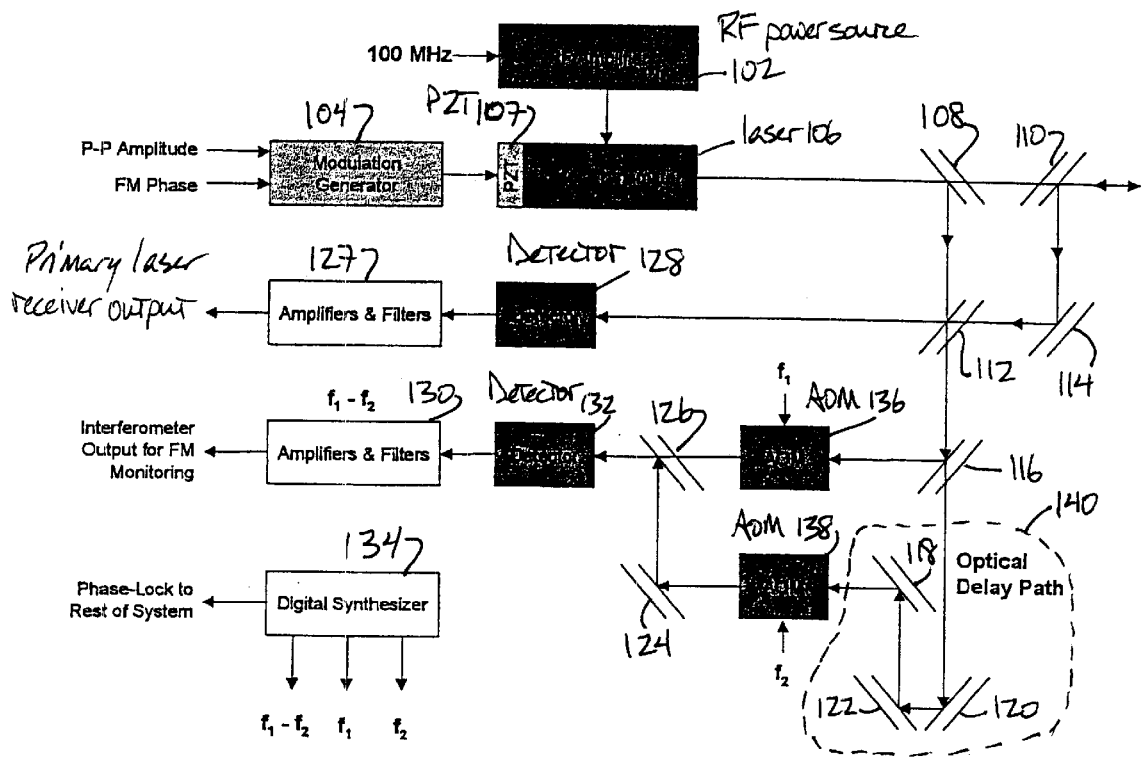
FIG. 1 shows a block diagram of a frequency modulation control of a laser, in accordance with an embodiment of the invention.

FIG. 1 shows an exemplary laser receiver and control circuit in accordance with the invention. A laser transmitter 106 is frequency-modulated via a piezoelectric transducer (PZT) 107, and a modulation generator 104 controls the PZT 107. An RF source 102 is also connected to the laser transmitter 106 to supply power to excite the laser. The mirror 108 is used to sample the output of the laser transmitter 106, and the mirrors 110, 114 direct laser light returning from a target to a detector 128 connected to a first module 127 of amplifiers and filters, for the purpose of determining a range to the target. The mirror 112 also directs a portion of the sampled output of the laser, to the detector 128 for purposes of determining the range to the target. The mirror 116 splits the remaining portion of the sampled output of the laser in two, and directs the first part to a first acousto-optic modulator (AOM) 136, while allowing the second, remaining part to pass through the mirror 116 and enter an optical delay path 140 composed of spaced mirrors 120, 122, 118.

A delay $\tau$ provided by the optical delay path 140 is proportional to the length of the path, where $\tau=L/c$ where L is the path length, and c is the speed of light through the path.

After passing through the optical delay path 140, the second part is directed to a second AOM 138. Laser light emerging from the AOMs 136, 138 is directed to a detector or mixer 132 via mirrors 124, 126. An output signal of the detector 132 is provided to a second module 130 of amplifiers and filters, and the output of the second module 130 is ultimately used to control the modulation of the laser transmitter 106. A digital synthesizer 134 provides reference signals for use within the system, for example by the AOMs 136, 138.

In particular, the second detector 132 in FIG. 1 produces a heterodyne of the un-delayed, shifted laser signal $$a \cdot \cos([\omega_{laser} - \omega_1]t) \tag{1}$$

and the delayed, shifted signal is $$a \cdot \cos([\omega_{laser} - \omega_2](t-\tau) - \Psi) \tag{2}$$

where the AOMs 136, 138 perform the shifts by $\omega_1$ and $\omega_2$ respectively, and where $\tau$ is the delay imposed by the optical delay path. The phase angle $\Psi$ represents a phase angle due to phase shifts in hardware and the exact length of the optical paths. It can be considered to be stable, but not set to any particular value.

We will consider that the AOMs 136, 138 shift the optical frequency down by $f_1$ or $f_2$ and that $f_1 > f_2$. Thus we define a positive $$f_{IF} = f_1 - f_2 \tag{3}$$

The "Interferometer Output for FM Monitoring" of FIG. 1 is then $$x(t) = a^2 \cdot \cos([\omega_{laser} - \omega_2] \cdot (t - \tau) - \Psi - [\omega_{laser} - \omega_1] \cdot t) \tag{4}$$

$$= a^2 \cdot \cos(\omega_{IF} \cdot t - \omega_L \cdot \tau - \Psi) \tag{5}$$

where $\omega_{IF} = 2\pi f_{IF}$ and $\omega_L = \omega_{laser} - \omega_2$
We can also write $$x(t) = Re(X \cdot e^{j(\omega_{IF} t)}) \tag{6}$$

where $$X = a^2 \cdot e^{-j(\omega_L \tau + \Psi)} \tag{7}$$

We can sample the signal x(t) at 4 times the IF frequency ($f_{IF}$) of sampling by forming the I(n) samples from consecutive even samples and the Q(n) samples from consecutive odd samples thusly:

$$I(n) = x([4 \cdot n] \cdot T) - x([4 \cdot n + 2]T) \tag{8}$$

$$= \text{Re}(X \cdot e^{j(\omega_{IF}[4n]T)} - X \cdot e^{j(\omega_{IF}[4n+2]T)}) \tag{9}$$

$$= \text{Re}(X \cdot e^{j(2\pi n)} - X \cdot e^{j(2\pi n + \pi)}) \tag{10}$$

$$= 2a^2 \cos(\omega_L \tau + \Psi) \tag{11}$$

and $$Q(n) = x([4 \cdot n + 1]T) - x([4 \cdot n + 3]T) \tag{12}$$

$$= \text{Re}(X \cdot e^{j(\omega_{IF}[4n+1])} - X \cdot e^{j(\omega_{IF}[4n+3]T)}) \tag{13}$$

$$= \text{Re}\left(X \cdot e^{j(2\pi n + \frac{\pi}{2})} - X \cdot e^{j(2\pi n + \frac{\pi}{2} + \pi)}\right) \tag{14}$$

$$= \text{Re}(j \cdot 2 \cdot X) \tag{15}$$

$$= -\text{Im}(2 \cdot X) \tag{16}$$

$$= 2a^2 \cdot \sin(\omega_L \cdot \tau + \Psi) \tag{17}$$

where $T = \dfrac{2\pi}{4 \cdot \omega_{IF}}$ (i.e., sample rate = $4 \cdot f_{IF}$)

Now we can derive our estimate of the (instantaneous) laser frequency as $$f_{est}(n) = \left(\frac{1}{2\pi \cdot \tau}\right) \cdot a\tan2(Q(n), I(n)) \tag{18}$$

$$= \left(\frac{1}{2\pi \cdot \tau}\right) \cdot a\tan2(2a^2 \sin(\omega_L \cdot \tau + \Psi), 2a^2 \cos(\omega_L \cdot \tau + \Psi)) \tag{19}$$

$$= \left(\frac{1}{2\pi \cdot \tau}\right) \cdot (\omega_L \cdot \tau + \Psi + 2\pi p) \tag{20}$$

$$= f_L + f_{amb} \tag{21}$$

where atan2 is the four quadrant arctangent function,
where $$f_L = \frac{\omega_L}{2\pi} \tag{22}$$

and where the $2\pi \cdot p$ ambiguity and the unknown $\Psi$ contribute to the unknown, but stable frequency ambiguity:

$$f_{amb} = \frac{\Psi}{2\pi \cdot \tau} + \frac{p}{\tau} \tag{23}$$

(where p is an integer)

Usually we do not need to know $f_L$ unambiguously, but rather, we would like to stabilize it through a control loop that uses any variations as feedback. If unambiguous measurement of $f_L$ is desired, other means (such as knowing the possible laser emission frequency limits) may be used to resolve the approximate integer p. The ambiguous interval of frequency is $1/\tau$. For example, if a 4-meter delay line were used, the interval would be 75 MHZ.

Even if the laser frequency is modulated, the foregoing derivation is a good approximation for most applications. Assuming sinusoidal FM of the laser, $$f_L(t) = f_0 - f_2 + \Delta f \cdot \cos(\omega_m \cdot t + \theta_m) \tag{24}$$

where $\Delta f$ is the peak deviation,
$f_0$ is the laser center frequency,
$\omega_m = 2\pi f_m$ is the frequency of the sinusoid, and
$\theta_m$ is the phase angle of the modulation We can design the modulation to be synchronous to the IF frequency, i.e., so that the modulation period is a multiple M of the IF period:

$$f_m = \frac{1}{M \cdot 4 \cdot T} \quad \omega_m = \frac{2\pi}{4 \cdot M \cdot T} \quad (5)$$

The average frequency of the laser is obtained by averaging the measured frequency over exactly one cycle (with exactly M samples per cycle). M can be, for example, an integer multiple of 4. Note that I(n)+jQ(n) is sampled at a sampling interval of 4·T, or with a sampling frequency of $f_{IF}$ since $$T = \frac{2\pi}{4 \cdot \omega_{IF}}.$$

Thus, average frequency can be obtained in the following fashion:

$$f_{ave} = \frac{1}{M} \cdot \sum_{n=0}^{M-1} f_{est}(n) \quad (25)$$

$$= \frac{1}{M} \cdot \sum_{n=0}^{M-1} (f_{amb} + f_L) \quad (26)$$

$$= f_0 + f_{amb} - f_2 + \frac{\Delta f}{M} \cdot \sum_{n=0}^{M-1} \cos\left(\frac{2\pi}{4MT} \cdot n4T + \theta_m\right) \quad (27)$$

$$= f_0 + f_{amb} - f_2 \quad (28)$$

Note that the last term of equation (27) is identically zero, yielding equation (28). Thus, $f_{ave}$ is the measure of the laser center frequency $f_0$, offset by fixed ambiguity of $f_{amb}-f_2$.

With respect to obtaining a measure of peak deviation, assuming we use a control loop to control the modulation phase to be very close to $\theta_M=0$, we can form the square-wave weighted sum of samples of $f_{est}(n)$. For simplicity we will illustrate integration over a single modulation period, as shown below in equations (29)–(32).

Figure 2:
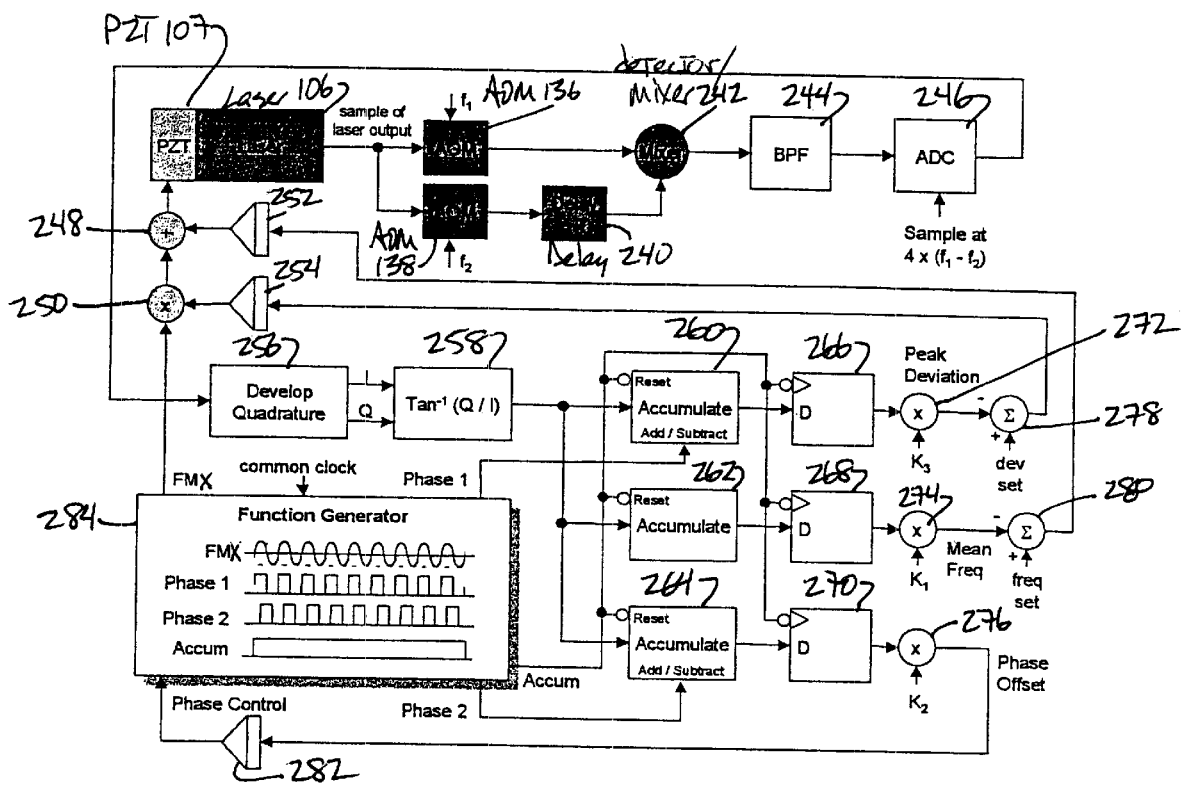
FIG. 2 shows a block diagram of a frequency modulation control of a laser, in accordance with an embodiment of the invention.

The first M/2 samples will be weighted by the +1 value of the square wave, while the second M/2 samples will be weighted by the −1 value of the square wave (wherein, for example, the square wave is the Phase 1 square wave generated by the function generator 284 shown in FIG. 2).

$$S_{dev} = \sum_{n=0}^{\frac{M}{2}-1} f_{est}(n) + (-1) \cdot \sum_{n=\frac{M}{2}}^{M-1} f_{est}(n) \quad (29)$$

$$= \sum_{n=0}^{\frac{M}{2}-1} \left(f_0 - f_2 + f_{amb} + \Delta f \cdot \cos\left(\frac{2\pi}{4MT} \cdot n \cdot 4 \cdot T\right)\right) - \sum_{n=\frac{M}{2}}^{M-1} \left(f_0 - f_2 + f_{amb} + \Delta f \cdot \cos\left(\frac{2\pi}{4MT} \cdot n \cdot 4 \cdot T\right)\right) \quad (30)$$

$$= \sum_{n=0}^{\frac{M}{2}-1} \left(f_0 - f_2 + f_{amb} + \Delta f \cdot \cos\left(\frac{2\pi}{4MT} \cdot n \cdot 4 \cdot T\right)\right) - \sum_{k=0}^{\frac{M}{2}-1} \left(f_0 - f_2 + f_{amb} + \Delta f \cdot \cos\left(\frac{2\pi}{4MT} \cdot k \cdot 4 \cdot T + \frac{2\pi}{4MT} \cdot \frac{M}{2} \cdot 4 \cdot T\right)\right) \quad (31)$$

$$= \Delta f \sum_{k=0}^{\frac{M}{2}-1} 2\cos\left(\frac{2\pi k}{M}\right) \quad (32)$$

Where in the second summation of equation (31), we have made the change of variables $$k = \left(n - \frac{M}{2}\right)$$

From this, we deduce our estimate of peak FM deviation as $$\Delta f = \frac{S_{dev}}{K_0}, \quad \text{where } K_0 = 2 \cdot \sum_{k=0}^{\frac{M}{2}-1} \cos\left(\frac{2\pi k}{M}\right)$$

Phase error is derived in a similar fashion to the derivation of peak deviation, but derives error that (for small angles) is proportional to $\theta_m$. Based on the foregoing descriptions, those ordinarily skilled in the art can easily derive the phase error, and thus the derivation is not reproduced here. The phase error is used to close the loop that keeps $\theta_m \approx 0$.

In summary, the computed frequency estimate can be used to monitor the frequency deviation and phase shift of the FM modulation of the laser, for example in each of one or more ranging modes when the laser is used in a rangefinding device. The estimates of these parameters will be used to accurately adjust the modulation parameters to those assumed by the range processing algorithm implemented in the rangefinding device. Such algorithms are well known in the art of rangefinding. The frequency measure thus produced is then processed in three different ways.

First, the signal is integrated over an exact integer number of modulation cycles (when modulating) or for a preset interval of samples (when no modulation is present). The resulting signal is a measure of the average frequency of the laser, and can be used as feedback in a second-order control loop to stabilize the laser center frequency.

Second, the signal is multiplied by a square wave that will be 90 degrees out of phase with the FM modulation when the modulation phase is properly adjusted. The product is then integrated for an exact integer number of modulation cycles. The "multiplication" can be accomplished by changing the sense of the digital integrator, rather than using a digital multiplier. In other words, multiplication of the signal by a square wave can be accomplished using accumulators (integrators) rather than multipliers, thus reducing circuit complexity and power consumption. Since the square wave for purposes of the multiplication is binary and has either a value of either +1 or −1, multiplying the signal by the square wave and then integrating (accumulating) the result is the same as multiplying the current sample of the signal by +1 or −1 (the instant value of the square wave) and then adding the result to the cumulative total (of multiplied sample values). This can be done, for example, by applying the square wave to the add/subtract input of the accumulator, and applying the signal samples to the accumulator. The result from the integrator/accumulator will be an error signal that nulls when the phase of the laser is properly adjusted. Note that multiplication of the signal by a sine wave of the same period as the above-mentioned square wave, instead of by the square wave, would be slightly preferable from a noise and spurious signal susceptibility point of view, but would require an actual digital multiplier, which would add to the complexity (and likely also the power requirements) of the implementation. This refinement may be unnecessary to achieve desired or required accuracy in most applications.

Third, the signal is also multiplied by a square wave that will be in-phase with the FM modulation when the processing described above (of integrating the signal over an exact integer number of modulation cycles or for a preset interval of samples, to obtain the average frequency of the laser), has properly aligned the modulation phase. This product is also integrated as in the process of obtaining the average frequency of the laser, but the result is proportional to the peak-to-peak frequency modulation. The result is scaled to a deviation estimate that is subtracted from a set-point deviation to produce an error signal. This error signal closes a second-order loop to correct the frequency deviation of the FM modulation. Multiplication of the signal with the in-phase square wave and integration of the result can be accomplished in the same fashion as described above with respect to the out-of-phase square wave (e.g., by applying the square wave to the Add/Subtract input of an accumulator). In addition, the same principles noted above apply, when considering the viable alternative of using a sine wave instead of the square wave.

Note that the coefficients of processing to obtain the estimate of phase estimate and the estimate of deviation of the FM modulation, described for example in the immediately preceding paragraphs, depend on the modulation frequency. The average frequency loop, or estimation of average frequency, does not change with modulation, so long as the integration period is an integer multiple of the modulation period when the modulation is present.

Those of ordinary skill in the art will also recognize that the integration (or accumulation) time can be appropriately selected. At the end of this time, one or more corrections is applied and the time is reset and the integration begun anew. The longer the integration time, the more accurate the estimates. However, the stability of the laser must also be considered. The less stable the laser, the more frequently it will need to be corrected. Thus, the accuracy of each correction must be balanced against a desirable or necessary frequency of correction (e.g., how often corrections are applied). This of course will depend on the practical details of specific implementations, for example the specific laser being used, and can be easily determined by those of ordinary skill in the art.

An example implementation of a laser frequency and FM control device in accordance with exemplary embodiments of the present invention, is shown in FIG. 2. FIG. 2 shows a laser 106 with a PZT (Piezo-Electric Transducer) 107 that modulates the wavelength of the laser. A sample from the output of the laser 106 having a frequency f is provided to AOMs (Acousto-Optical Modulators) 136, 138 which are respectively modulated with input frequency signals $f_1$, $f_2$. The output of the AOM 136, which will have a frequency equal to $f-f_1$, is provided to a detector/mixer 242. The output of the AOM 138, which will have a frequency equal to $f-f_2$, is provided to a delay 240 that delays the signal by a time $\Delta T$. The delayed signal from the delay 240 is also provided to the detector/mixer 242. The detector/mixer 242 outputs the mixed signal to a BPF (BandPass Filter) 244, which is centered on $f_{if}=f_1-f_2$. The output of the BPF 244 is provided to an ADC (Analog to Digital Converter) 246 which samples the output of the BPF 244 at a rate equal to $4 \cdot (f_1-f_2)$. The resulting samples are output from the ADC 246 to a Quadrature Development module 256 that generates quadrature signals I(n), Q(n) based on the signal samples from the ADC 246. The quadrature signals are provided from the module 256 to an atan2 module 258 that receives the quadrature signals and applies them as a dual-argument operand for the atan2 function, which is a 4-quadrant arctangent function well known in the art (e.g., atan2(Q, I)). The resulting value, $f_{est}(n)$, is provided (properly scaled) from the module 256 to each of three accumulators, 260, 262, 264.

The accumulator 260 also receives, at its Add/Subtract input, a Phase 1 square wave signal from the function generator 284. The Phase 1 square wave signal is generally in phase with the FMX signal, as can be seen by inspection of the function generator 284 as shown in FIG. 2. The FMX signal is a frequency modulation excitation voltage.

The accumulator 264 also receives, at its Add/Subtract input, a Phase 2 square wave signal from the function generator 284. The Phase 2 square wave signal is generally 90 degrees out of phase with the FMX signal, as can be seen by inspection of the function generator 284 as shown in FIG. 2.

Each of the accumulators 260, 262, 264 also receives, at a reset input, an Accum signal from the function generator 284. The Accum signal resets the accumulators when the accumulation or integration period is completed, so that a new period will begin.

The output of the accumulator 260 is proportional to the frequency deviation of the signal, $S_{dev}=K_0 \cdot \Delta f$. The output of the accumulator 262 is proportional to the mean frequency, $f_{ave} \cdot M$.

The Accum signal is also applied to clock inputs of D flip flop circuits 266, 268, 270 that are respectively connected to the outputs of the accumulators 260, 262, 264, to register the accumulation/integration results at the end of an accumulation time interval, and transfer these results to the outputs of the D flip flop circuits 266, 268, 270. The outputs of the D flip flop circuits 266, 268, 270 are respectively applied to multipliers 272, 274, 276, that multiply the outputs respectively by the factors $K_3$, $K_1$, $K_2$.

The output of the multiplier 272 is subtracted from a deviation setpoint or set value in a summer 278, to generate a deviation error signal that is fed back to an integrator 254. The output of the integrator 254 is applied to a multiplier 250 to change or adjust the modulation of the laser 106 by the FMX output of the function generator 284.

The output of the multiplier 274 is subtracted from a frequency setpoint or set value in a summer 280, to generate a frequency error signal that is fed back to an integrator 252 and applied via the adder 248 to the PZT 107 to change or adjust the center frequency of the laser 106.

Specifically, the output of the integrator 254 is multiplied with the FM modulation signal output from the function generator 284, in a multiplier 250, and the result is then added to the output of the integrator 252 in an adder 248. The final result from the adder 248 is supplied to the PZT 107.

The output of the multiplier 276 represents the phase offset, and is supplied to an integrator 282 whose output is fed to the function generator 284. The function generator uses the integrated phase offset signal from the integrator 282 to shift the phase of the FMX excitation signal to the Phase 1, Phase 2, and Accum signals. The Phase 1 and Phase 2 signals are always 90 degrees out of phase with each other.

The common clock signal provided to the function generator 284 can have a frequency equal to $(f_1-f_2)$, which is thus an exact multiple of the modulation frequency $f_m$.

The feedback loops shown in FIG. 2 are type-II loops, so that there should be no steady-state frequency error in the absence of significant drift characteristics, and so that linear drift characteristics can be reduced to the required level by adjusting the loop gain.

Figure 10:
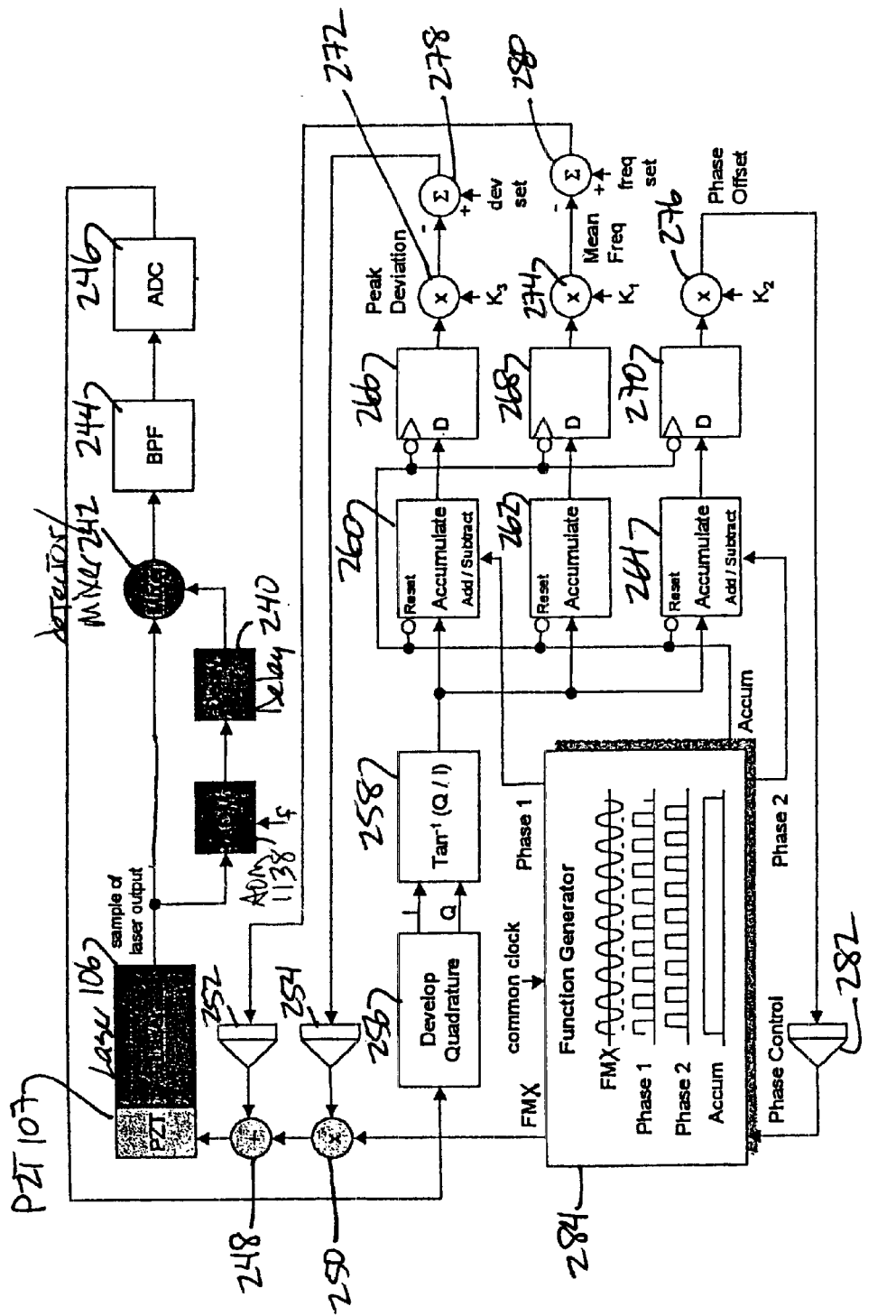
FIG. 10 shows a block diagram of a frequency modulation control of a laser, in accordance with an embodiment of the invention.
Figure 11:
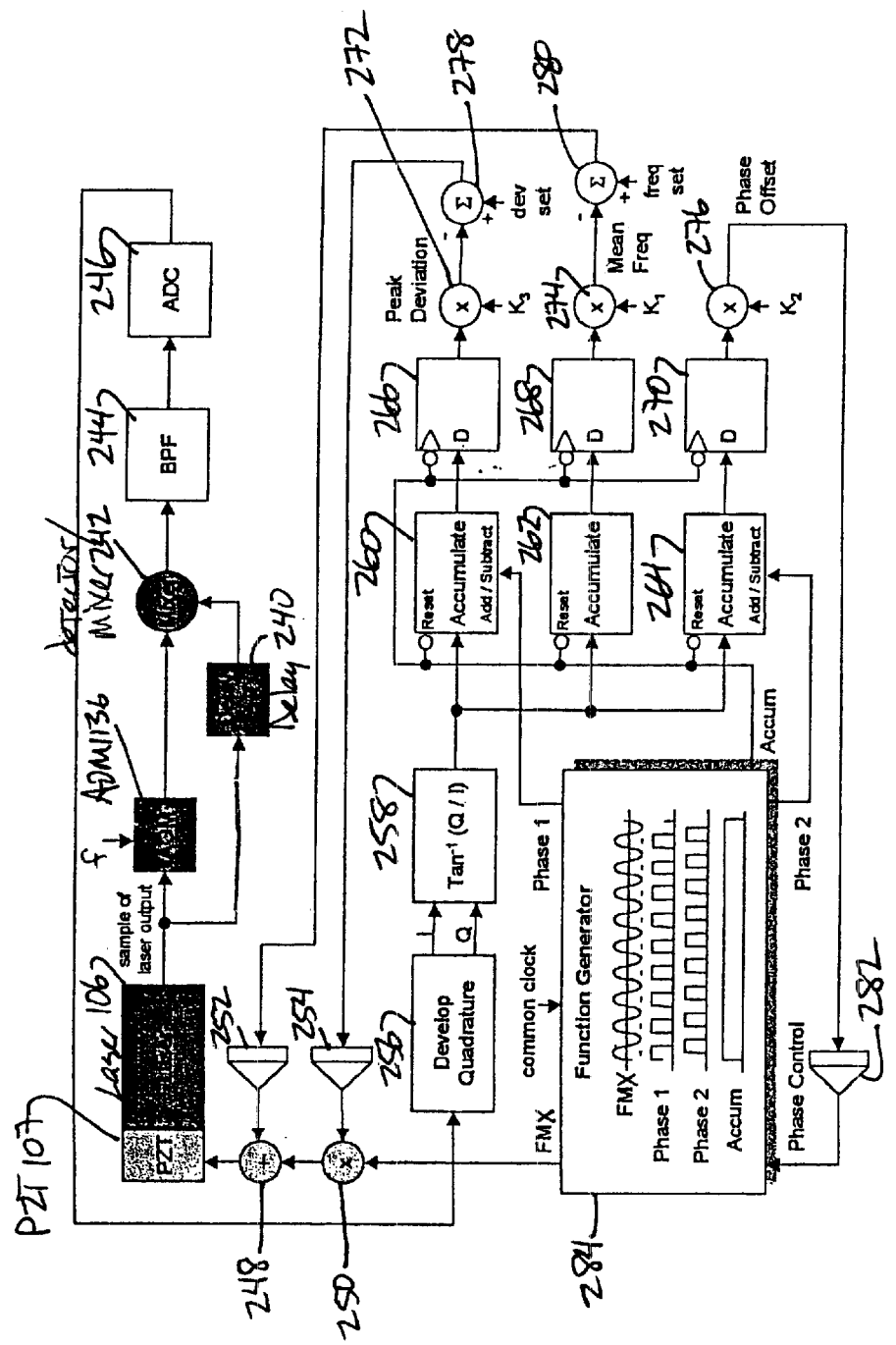
FIG. 11 shows a block diagram of a frequency modulation control of a laser, in accordance with an embodiment of the invention.

FIGS. 10–11 show embodiments similar to the embodiment shown in FIG. 2, but which have one AOM instead of two AOMs. Ordinarily, $f_1$ and $f_2$ are chosen so that the difference $(f_1-f_2)$ is a desired value, for example, 1 megahertz. When only one AOM is provided, and is supplied with an input frequency signal f, the difference is effectively f–0=f. Thus, when one AOM is used, the input frequency signal f that is supplied to the AOM should be equal to the desired value. FIG. 10 shows an embodiment where only one AOM 1138 is provided, and is connected to the delay 240. FIG. 11 shows another embodiment where only one AOM 1136 is used, connected directly between the laser output sample and the detector/mixer 242. In the embodiments shown in FIGS. 10–11, the ADC 246 preferably samples at 4·f where f is the frequency input to the single AOM 1136, 1138. Those of ordinary skill in the art will recognize that the frequencies $f_1$, $f_2$ of FIG. 2 and the frequency f of FIGS. 10–11 can be appropriately selected, based on circumstances of a particular application and on available resources and components (e.g., available AOMs).

Figure 3:
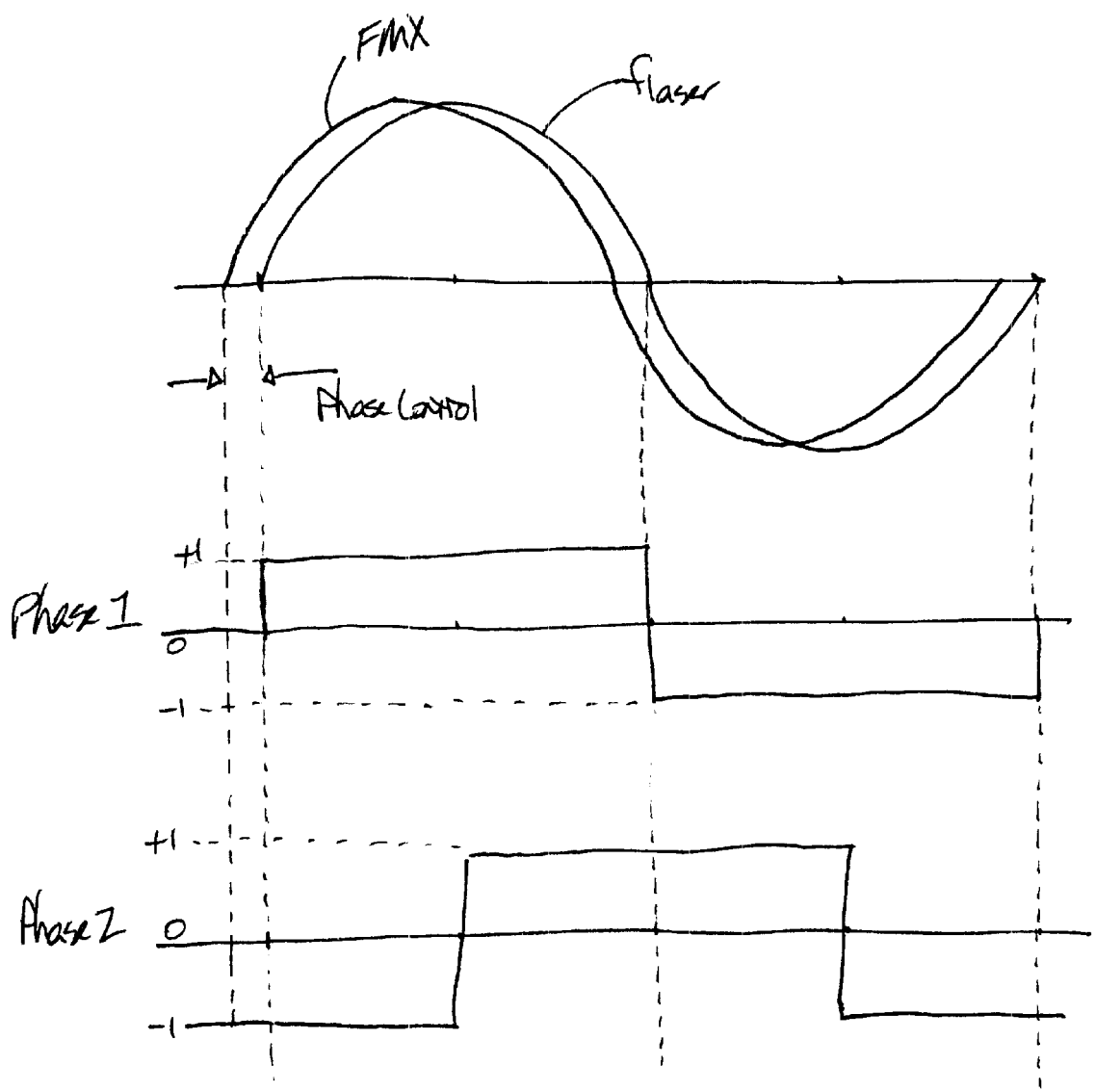
FIG. 3 shows an example of selected signals from operation of the device shown in FIG. 2.

FIG. 3 shows a real world example, where the actual frequency of the laser, $f_{laser}$ is controlled to be in phase with the square wave Phase 1, and 90 degrees out of phase with the square wave Phase 2. The FMX signal output from the function generator 284 is also shown, slightly advanced with respect to the laser frequency $f_{laser}$ by an amount corresponding to the phase control input signal received from the integrator 282. Typically the laser will lag a little.

The signals Phase 1, Phase 2, Accum, and FMX in the function generator 284 can be generated by using at least one counter that receives the clock signal, and outputs addresses in a ROM (Read Only Memory) that contains values for points on the curves of the periodic signals Phase 1, Phase 2, and FMX. In other words, the ROM can have sequential signal values located in sequentially addressed memory locations, so that the output of the counter can be used to generate the sequential addresses and access the corresponding signal values. Phase of a periodic signal can be adjusted adding an appropriate offset to the counter value/memory address. Of course, other appropriate techniques well known in the art of function generation can additionally or alternatively be used.

A description of an experimental implementation follows, with reference to FIGS. 4–9. Interferometer data with the following characteristics was used to successfully verify that adequate estimates of the peak-deviation and phase-shift characteristics of the modulation can be derived. The laser wavelength was 11.15 micrometers, the IF frequency was 1.25 Megahertz, the sampling frequency was 25 Megahertz (5-times oversampled-5 Megahertz required), with a carrier-to-noise ratio greater than 50 dB in 300 Hz bandwidth after the detector, using a 5 Megahertz low-pass filter. The number of samples was 13,000. The target modulation was 4.6 kilohertz modulation frequency with 700 kilohertz peak deviation.

Figure 4:
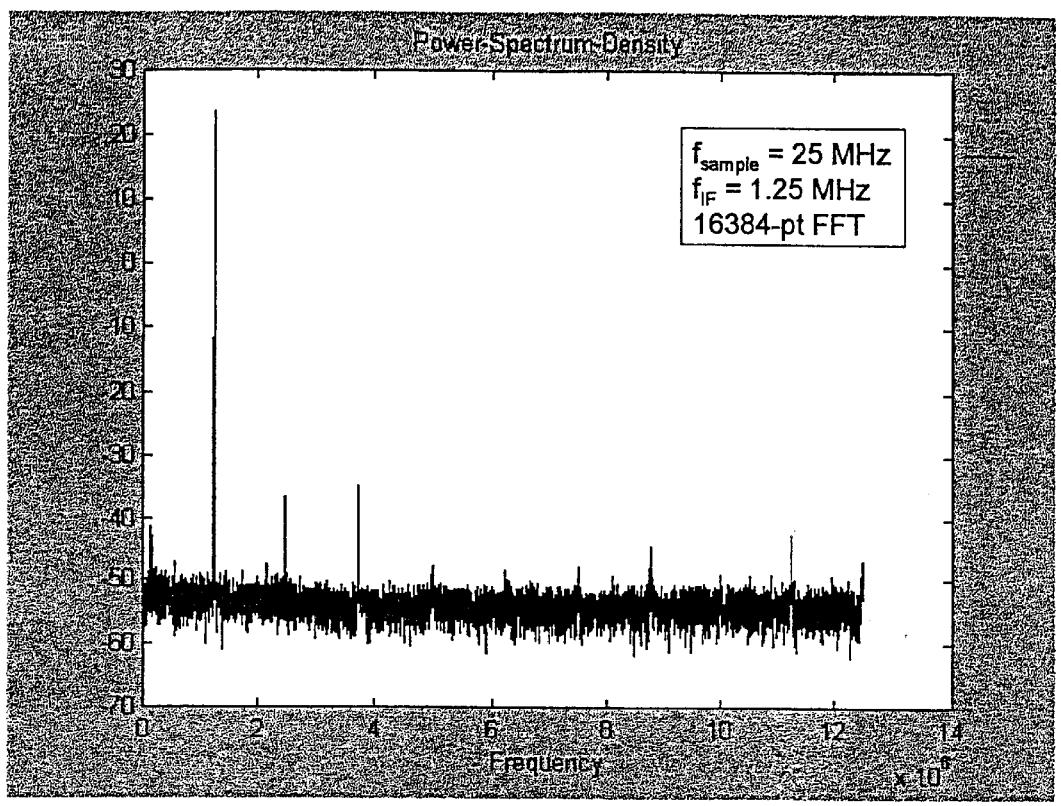
FIG. 4 shows a power spectrum of an interferometer IF signal in an experimental implementation of an embodiment of the invention.

The interferometer setup was similar to that shown in FIG. 1, except that the frequencies $f_1$, $f_2$ and the IF frequency were not all phase locked together. Instead, they were adjusted to be as close as possible manually using separate signal generators. The laser also was found to have significant frequency drift when operating it without closed-loop frequency stabilization. FIG. 4 shows the IF signal power spectrum, indicating that a good SNR was obtained. Because the modulation index of the laser is extremely high (greater than 150) the discriminator frequency measure should have a high SNR. In fact, the majority of the noise present is due to the noise of the A/D converter used to sample the IF signal. The figure shows the 1.25 megahertz carrier and its second and third harmonics. Since this is the signal after the phase/frequency differencing produced by the mixer/detector, the phase modulation is very low-index at this point and cannot be seen on this scale in the power spectrum.

Figure 5:
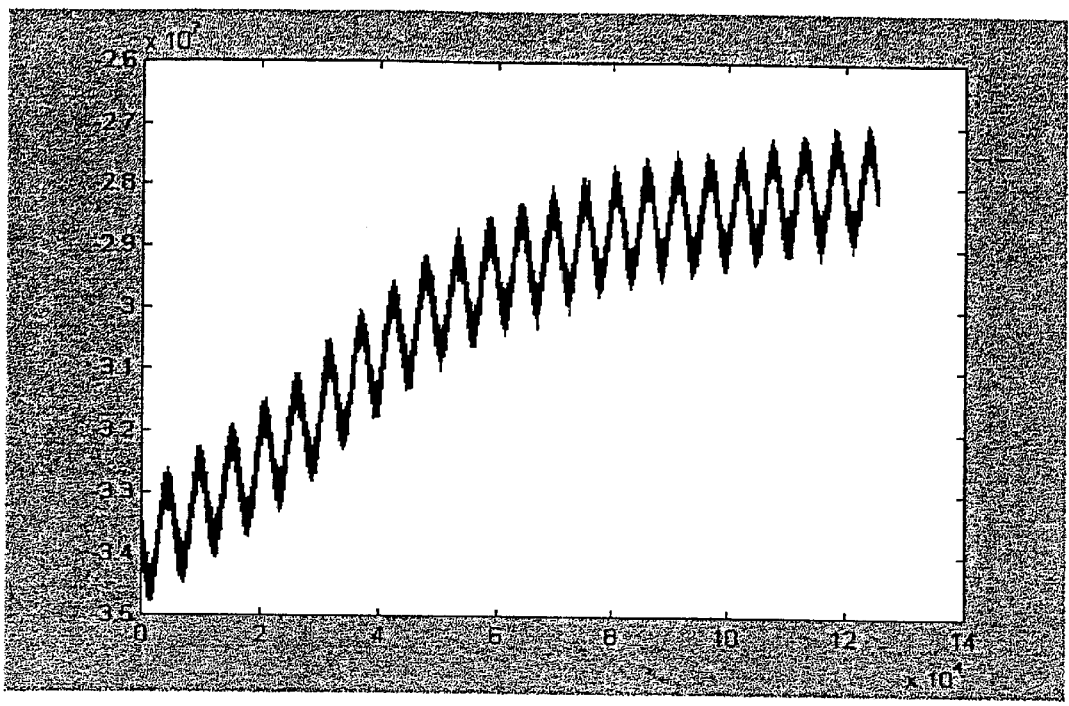
FIG. 5 shows an instantaneous frequency measure from the interferometer in the experimental implementation of an embodiment of the invention.
Figure 6:
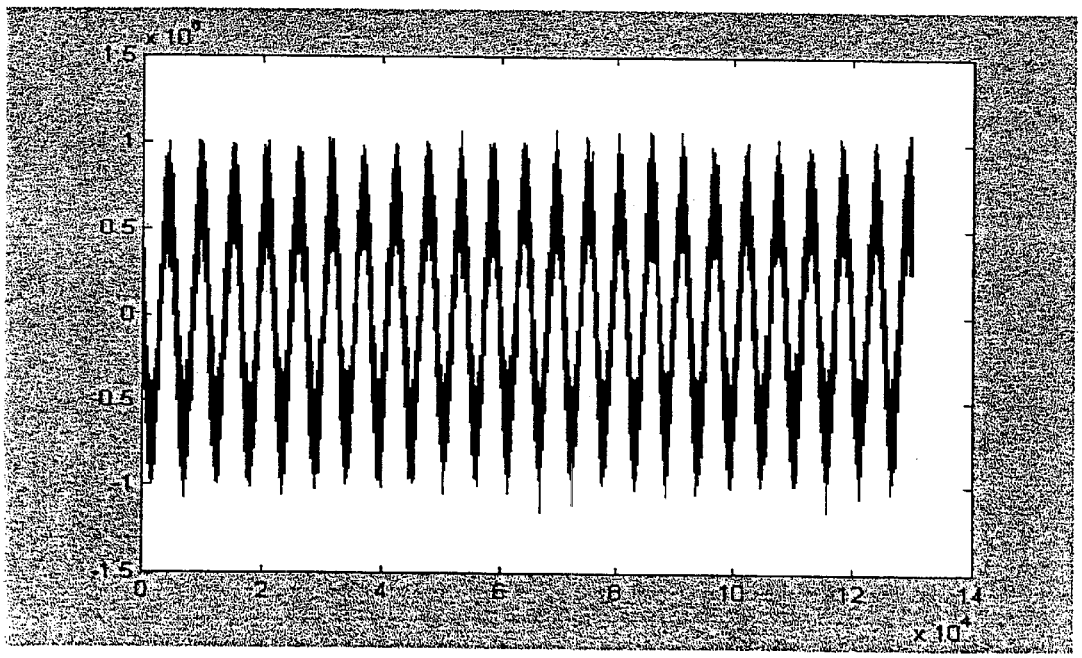
FIG. 6 shows a corrected instantaneous frequency measure from the interferometer in the experimental implementation of an embodiment of the invention.
Figure 7:
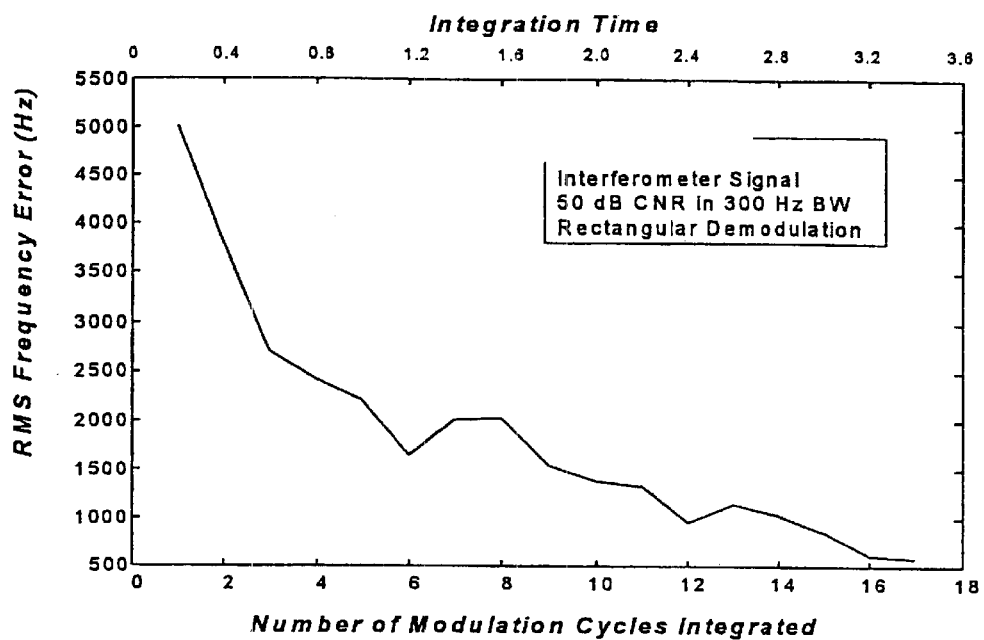
FIG. 7 shows an interferometer frequency measurement error vs. integration time in the experimental implementation of an embodiment of the invention.
Figure 8:
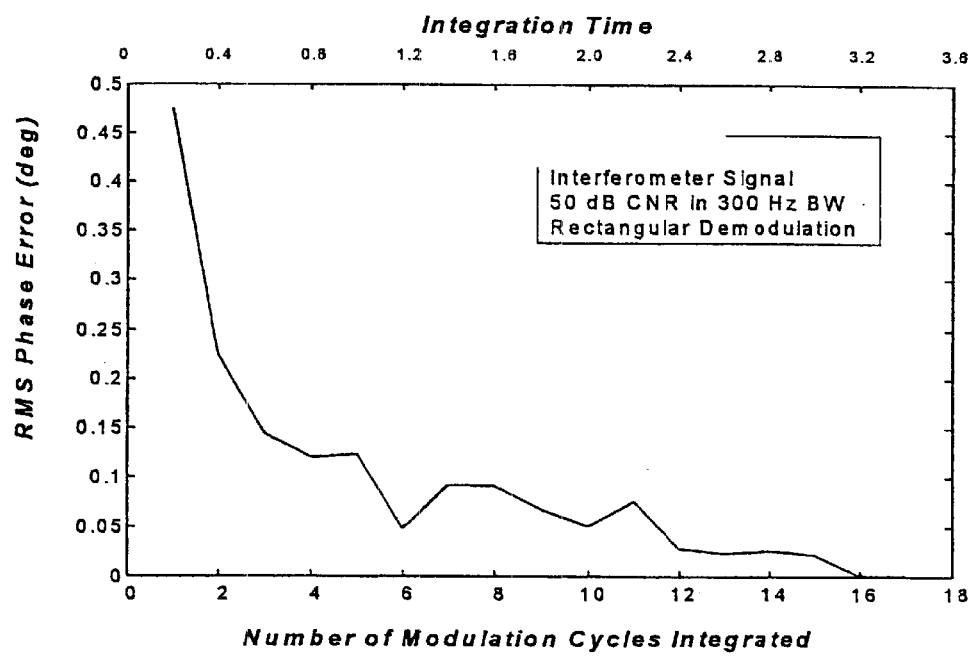
FIG. 8 shows a phase consistency as a function of integration time, in the experimental implementation of an embodiment of the invention.

The frequency measure (the scaled arctangent result) is plotted in FIG. 5, showing a relatively large amount of laser frequency drift over a short (4 millisecond) time period. (This amount of drift would be excessive in a well-designed laser). The drift was estimated from the data in a piecewise linear fashion and then subtracted to give the more reasonable frequency measure (more typical of a well-designed system) shown by FIG. 6. This signal was then processed according to the algorithm demonstrated in FIG. 2 for integration times from about 0.2 to 3.6 milliseconds. The results are shown in FIG. 7. If longer integrations times are or can be used, the errors can be systematically reduced as the square root of the integration time. Phase consistency is likewise shown in FIG. 8.

Figure 9:
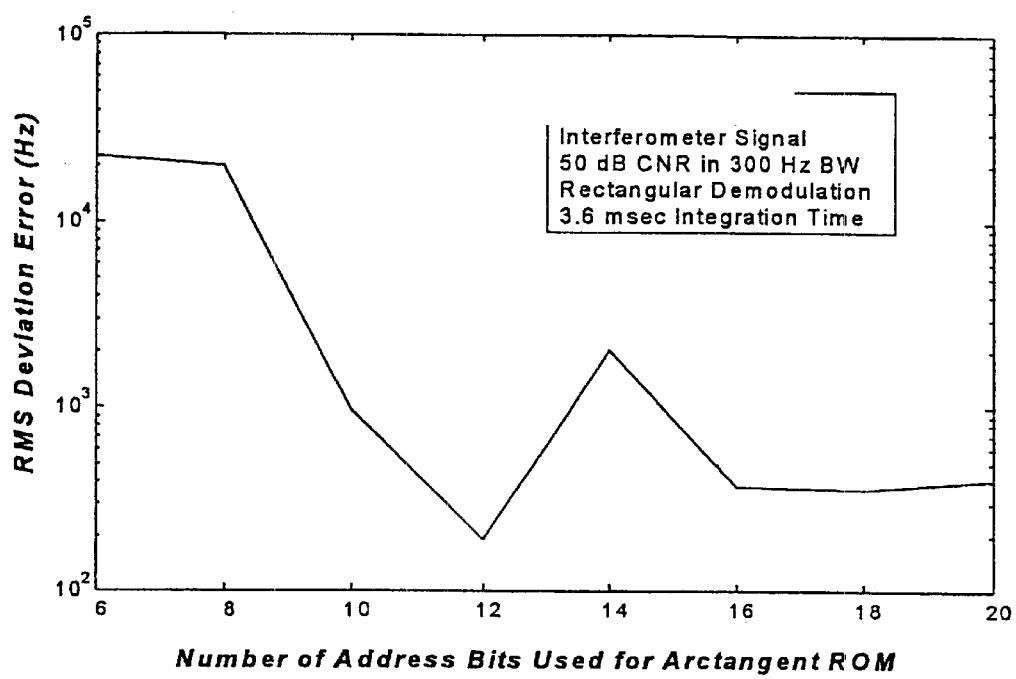
FIG. 9 shows a frequency measurement error vs. arctangent ROM size for the experimental implementation of an embodiment of the invention.

Finally, to ensure that the implementation is practicable, the quantization of the arctangent function was simulated, as would occur if lookup tables in ROM or RAM (Random Access Memory) were used to store the function. FIG. 9 indicates that the use of 20 bits of address (10 bits for each of I and Q) appears to be quite adequate, allowing the use of a 1-Meg word memory (with 2 bytes per word). Reviewing FIG. 2, one sees that the processing can be implemented very efficiently using a very reasonable amount of readily availabe digital hardware.

It will be appreciated by those skilled in the art that the present invention can be embodied in other specific forms without departing from the spirit or essential characteristics thereof, and that the invention is not limited to the specific embodiments described herein. The presently disclosed embodiments are therefore considered in all respects to be illustrative and not restrictive. The scope of the invention is indicated by the appended claims rather than the foregoing description, and all changes that come within the meaning and range and equivalents thereof are intended to be embraced therein.

What is claimed is:

1. An apparatus for modulating the frequency and phase of a laser, comprising:
   a delay-line inteferometer for sampling the laser, the interferometer including a frequency offset in at least one leg of the optical path of the interferometer;
   an intermediate frequency processor for filtering and converting the output of the interferometer;

a quadrature module for receiving an output of the intermediate frequency processor, and extracting quadrature components from the received output;

an arctangent function module connected to convert the extracted quadrature components to a phase measure that is proportional to the frequency of the laser;

a plurality of correlator circuits connected to extract a modulation peak deviation, an average frequency of the laser, and a modulation phase error from the phase measure; and at least one feedback loop for controlling the laser based on the extracted modulation peak deviation, the extracted average frequency of the laser, and the extracted modulation phase error.

2. The apparatus of claim 1, further comprising at least one acousto-optic modulator for generating the frequency offset.

3. The apparatus of claim 1, wherein the intermediate frequency processor outputs a digital signal to the quadrature module, and the quadrature module is a digital quadrature module.

4. The apparatus of claim 1, further comprising a function generator for generating first and second reference signals, wherein the first reference signal is 90 degrees out of phase with the second reference signal, the first reference signal is provided to a first one of the plurality of correlator circuits, and the second reference signal is provided to a second one of the plurality of correlator circuits.

5. The apparatus of claim 1, wherein the first and second reference signals are square waves, and wherein the first and second reference signals are connected respectively to add/subtract inputs of the first and second ones of the plurality of correlator circuits.

* * * * *